(12) United States Patent
Li et al.

(10) Patent No.: US 12,258,009 B2
(45) Date of Patent: Mar. 25, 2025

(54) CRUISE CONTROL METHOD AND SYSTEM, AND VEHICLE

(71) Applicant: GREAT WALL MOTOR COMPANY LIMITED, Baoding (CN)

(72) Inventors: Jinchuan Li, Baoding (CN); Hejia Wei, Baoding (CN); Shuli Li, Baoding (CN); Longbao Zhen, Baoding (CN); Pu Li, Baoding (CN); Shasha Gao, Baoding (CN); Fengyue Zhang, Baoding (CN); Hongning Zhang, Baoding (CN); Hong Dong, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 316 days.

(21) Appl. No.: 17/758,172

(22) PCT Filed: Apr. 19, 2021

(86) PCT No.: PCT/CN2021/088124
§ 371 (c)(1),
(2) Date: Jun. 29, 2022

(87) PCT Pub. No.: WO2021/213325
PCT Pub. Date: Oct. 28, 2021

(65) Prior Publication Data
US 2023/0028980 A1     Jan. 26, 2023

(30) Foreign Application Priority Data
Apr. 20, 2020 (CN) ......................... 202010313650.7

(51) Int. Cl.
*B60W 30/095*    (2012.01)
*B60W 30/16*     (2020.01)
*B60W 50/14*     (2020.01)

(52) U.S. Cl.
CPC ........ *B60W 30/0956* (2013.01); *B60W 30/16* (2013.01); *B60W 50/14* (2013.01);
(Continued)

(58) Field of Classification Search
CPC .. B60W 30/0956; B60W 30/16; B60W 50/14; B60W 2552/10; B60W 2554/4041;
(Continued)

(56) References Cited

U.S. PATENT DOCUMENTS

2016/0144859 A1   5/2016  Yoo et al.
2017/0038777 A1*  2/2017  Harvey ................ G05D 1/0027
(Continued)

FOREIGN PATENT DOCUMENTS

CN    102712302    10/2012
CN    106560367     4/2017
(Continued)

OTHER PUBLICATIONS

WIPO, International Search Report for PCT/CN2021/088124, Jul. 15, 2021.
(Continued)

*Primary Examiner* — Anne Marie Antonucci
*Assistant Examiner* — Wesam Almadhrhi
(74) *Attorney, Agent, or Firm* — Hodgson Russ LLP (57) ABSTRACT

A cruise control method and system, and a vehicle, the method being applied to a first vehicle. When the first vehicle is driving in a first lane, before the first vehicle enters from the first lane into a preset recognition region to thereby complete vehicle identity recognition in the preset recognition region, the cut-in probability of a second vehicle cutting into the first lane can be predicted according to a movement parameter of the second vehicle that is in an adjacent second lane, and it is determined, according to the cut-in probability and the stopping time of the first vehicle, whether to brake (Continued)

to stop the first vehicle; therefore, during the process of controlling the first vehicle to pass through the preset recognition region, the driver is not required to temporarily take over control of the first vehicle.

18 Claims, 6 Drawing Sheets

(52) U.S. Cl.
CPC . *B60W 2552/10* (2020.02); *B60W 2554/4041* (2020.02); *B60W 2554/4042* (2020.02); *B60W 2554/4045* (2020.02); *B60W 2554/802* (2020.02); *B60W 2710/18* (2013.01); *B60W 2720/10* (2013.01)

(58) Field of Classification Search
CPC . B60W 2554/4042; B60W 2554/4045; B60W 2554/802; B60W 2710/18; B60W 2720/10; B60W 2520/10; B60W 2520/105; B60W 2554/801; B60W 2554/804; B60W 2554/806; B60W 30/0953; B60W 30/09; B60W 30/14; B60W 60/00274; B60W 2554/4043

See application file for complete search history.

(56) References Cited

U.S. PATENT DOCUMENTS

| | | | |
|---|---|---|---|
| 2017/0309182 A1 | 10/2017 | Murray et al. | |
| 2018/0009436 A1* | 1/2018 | Gupta | B60W 30/09 |
| 2019/0196491 A1* | 6/2019 | Balogh | G05D 1/0214 |
| 2019/0243371 A1* | 8/2019 | Nister | G06N 3/08 |
| 2020/0055495 A1* | 2/2020 | Takaki | B60T 8/17 |

FOREIGN PATENT DOCUMENTS

| | | |
|---|---|---|
| CN | 107438545 | 12/2017 |
| CN | 108001450 | 5/2018 |
| CN | 108116414 | 6/2018 |
| CN | 110197348 | 9/2019 |
| CN | 110234552 | 9/2019 |
| CN | 110267856 | 9/2019 |
| CN | 110341705 | 10/2019 |
| CN | 110406532 | 11/2019 |
| CN | 110745128 | 2/2020 |
| CN | 110920597 | 3/2020 |
| CN | 111645682 | 9/2020 |
| DE | 102017118651 | 2/2019 |
| JP | H10172098 | 6/1998 |
| JP | 2005199930 | 7/2005 |

OTHER PUBLICATIONS

CNIPA, First Office Action for CN Application No. 202010313650.7, Apr. 1, 2021.

* cited by examiner

CRUISE CONTROL METHOD AND SYSTEM, AND VEHICLE

CROSS REFERENCE TO RELEVANT APPLICATIONS

The present application is a U.S. national stage entry of International Application No. PCT/CN2021/088124, filed Apr. 19, 2021, which claims priority to Chinese Patent Application No. 202010313650.7 filed on Apr. 20, 2020, the entire disclosures of which are incorporated herein by reference.

TECHNICAL FIELD

The present disclosure relates to the technical field of vehicles, and more particularly, to a cruise control method, a system, and a vehicle.

BACKGROUND

At present, in order to reduce the driver's fatigue and improve the driver's experience, the autonomous control and driving technology of vehicles have been developed significantly.

Adaptive Cruise Control (ACC) system is an intelligent autonomous control system, which can not only maintain the driver's preset vehicle speed but also adjust its own speed according to the distance from other vehicles on the longitudinal lane and the speeds of other vehicles in order to ensure a safe distance.

However, the vehicle needs to pay fees through a corresponding Electronic Toll Collection (ETC) system when traveling on an expressway or bridge. However, there is a limited recognition distance in the ETC system, and can successfully recognize the license plates to collect fees only when the vehicle is traveling at a low speed to pass through. In such a case, if other vehicles in adjacent lanes cut in quickly, the ETC system is very easy to be cheated at payment. Although the ACC system can recognize the other vehicles in the longitudinal lanes, it has a difficulty in autonomous recognition of the vehicles on transverse lanes, particularly those vehicles cutting in from adjacent lanes. When other vehicles are cutting in from adjacent lanes, the driver is required to control the vehicle according to driving experiences, which results in inconvenience to the driving operation, and further leads to economic loss or safety hazards for the driver.

SUMMARY

In view of the above, the present disclosure aims to provide a cruise control method and system, and a vehicle, to resolve the problems that a temporary switch to the driver mode is required to lead to inconvenience and further economic loss or safety hazards may be caused for the driver due to the fact that existing vehicles, when self-driving in express ways, bridges, etc. and passing through an ETC system, cannot accurately and timely recognize the cut-in and payment cheat behaviors of other vehicles from adjacent lanes.

In order to achieve the above object, the technical solutions of the present disclosure are implemented as follows.

There is provided a cruise control method, applied to a first vehicle, wherein the method includes:
calculating a braking time of the first vehicle to stop outside a preset recognition region, when the first vehicle is located in a first lane and a second vehicle exists in a second lane adjacent to the first lane;
acquiring a first movement parameter of the second vehicle, the first movement parameter including at least one of a first speed parameter, a first distance parameter and a first angle parameter;
calculating a cut-in probability of the second vehicle to cut into the first lane according to the first movement parameter; and
controlling the first vehicle to stop, when the cut-in probability is greater than or equal to a preset cut-in probability and the braking time is less than a preset braking time.

Further, in the method, calculating the cut-in probability of the second vehicle to cut into the first lane according to the first movement parameter includes:
determining the cut-in probability of the second vehicle to cut into the first lane according to the first angle parameter and the first distance parameter, when the first speed parameter of the second vehicle is zero; and
calculating a traveling time of the second vehicle according to the first speed parameter and the first distance parameter and determining the cut-in probability of the second vehicle to cut into the first lane according to the first angle parameter and the traveling time, when the first speed parameter of the second vehicle is not zero.

Further, in the method, calculating the braking time of the first vehicle to stop outside the preset recognition region, when the first vehicle is located in the first lane and a second vehicle exists in a second lane adjacent to the first lane, includes:
acquiring a second movement parameter of the first vehicle and a braking security time, the second movement parameter including a traveling speed parameter and a traveling acceleration parameter;
calculating a braking deceleration time of the first vehicle, according to the traveling speed parameter and the traveling acceleration parameter; and
calculating the braking time of the first vehicle according to the braking deceleration time and the braking security time.

Further, in the method, after controlling the first vehicle to stop, when that the cut-in probability is greater than or equal to the preset cut-in probability and the braking time is less than the preset braking time, the method further includes:
prompting a driver to control the first vehicle, when the second vehicle does not cut into the first lane within a preset stationary time; and
alarming for a cut-in behavior of the second vehicle, if the second vehicle cuts into the first lane within a preset stationary time.

Further, in the method, after the calculating a cut-in probability of the second vehicle to cut into the first lane according to the first movement parameter, the method further includes:
controlling the first vehicle to enter the preset recognition region at a preset traveling speed, when that the cut-in probability is less than the preset cut-in probability;
controlling the first vehicle to leave the preset recognition region when the first vehicle receives successful recognition information; and
controlling the first vehicle to stop and prompting the driver to control the first vehicle, when the first vehicle does not receive successful recognition information.

Further, in the method, before calculating the braking time of the first vehicle to stop outside the preset recognition region, when the first vehicle is located in the first lane and the second vehicle exists in the second lane adjacent to the first lane, the method further includes:

acquiring location information of the first vehicle; and controlling a target vehicle to decelerate when the location information and the preset recognition region reach a preset deceleration distance, the preset deceleration distance being calculated from a current traveling speed of the first vehicle, a preset traveling speed and a deceleration.

Further, in the method, after calculating the cut-in probability of the second vehicle to cut into the first lane according to the first movement parameter, the method further includes:

acquiring problem data within a preset duration before and after the cut-in time at which the second vehicle cuts into the first lane, when the cut-in probability is less than the preset cut-in probability and the second vehicle cuts into the first lane.

It is another object of the embodiments of the present disclosure to provide a cruise control system, applied to a first vehicle, wherein the system includes:

a first calculation module, configured for calculating a braking time of the first vehicle to stop outside a preset recognition region, when the first vehicle is located in a first lane and a second vehicle exists in a second lane adjacent to the first lane;

a parameter acquisition module, configured for acquiring a first movement parameter of the second vehicle, the first movement parameter including at least one of a first speed parameter, a first distance parameter and a first angle parameter;

a second calculation module, configured for calculating a cut-in probability of the second vehicle to cut into the first lane according to the first movement parameter; and a vehicle control module, configured for controlling the first vehicle to stop, when the cut-in probability is greater than or equal to a preset cut-in probability and the braking time is less than a preset braking time.

Further, in the system, the second calculation module includes:

a first probability calculation submodule, configured for determining the cut-in probability of the second vehicle to cut into the first lane according to the first angle parameter and the first distance parameter, when the first speed parameter of the second vehicle is zero; and a second probability calculation submodule, configured for calculating a traveling time of the second vehicle according to the first speed parameter and the first distance parameter and determine the cut-in probability of the second vehicle to cut into the first lane according to the first angle parameter and the traveling time, when the first speed parameter of the second vehicle is not zero.

Further, in the system, the first calculation module includes:

a parameter acquisition submodule, configured for acquiring a second movement parameter of the first vehicle and a braking security time, the second movement parameter including a traveling speed parameter and a traveling acceleration parameter; and a braking time calculation submodule, configured for calculating a braking deceleration time of the first vehicle, according to the traveling speed parameter and the traveling acceleration parameter.

The braking time calculation submodule is further configured for calculating the braking time of the first vehicle according to the braking deceleration time and the braking security time.

Further, the system further includes:

a man-machine interactive module, configured for prompting a driver to control the first vehicle, when the second vehicle does not cut into the first lane within a preset stationary time.

The man-machine interactive module is further configured for alarming a cut-in behavior of the second vehicle, when the second vehicle cuts into the first lane within a preset stationary time.

Further, in the system, the vehicle control module is further configured for:

controlling the first vehicle to enter the preset recognition region at a preset traveling speed, when that the cut-in probability is less than the preset cut-in probability;

controlling the first vehicle to leave the preset recognition region, when the first vehicle receives successful recognition information; and controlling the first vehicle to stop and prompt the driver to control the first vehicle, when the first vehicle does not receive successful recognition information.

Further, in the system, the parameter acquisition module is further configured for acquiring location information of the first vehicle.

The vehicle control module is further configured for controlling the target vehicle to decelerate when the location information and the preset recognition region reach a preset deceleration distance, the preset deceleration distance being calculated from a current traveling speed of the first vehicle, a preset traveling speed and a deceleration.

Further, in the system, the parameter acquisition module is further configured for acquiring problem data within a preset duration before and after the cut-in time at which the second vehicle cuts into the first lane, when the cut-in probability is less than the preset cut-in probability and the second vehicle cuts into the first lane.

It is yet another object of the present disclosure to provide a vehicle; the vehicle includes a system for implementing the cruise control method described above, or, the vehicle includes the cruise control system described above.

The cruise control method and system and the vehicle according to the present disclosure have the following advantages relative to the prior art.

Before the first vehicle enters a preset recognition region from the first lane where it is located to thereby complete vehicle identity recognition in the preset recognition region, a cut-in probability of a second vehicle that is in an adjacent second lane to cut into the first lane may be predicted according to the movement parameter of the second vehicle, and then it may be determined whether to brake the first vehicle according to the cut-in probability and a braking time of the first vehicle, so that the driver is not required to temporarily take over control of the first vehicle during the course of controlling the first vehicle to pass through the preset recognition region, therefore, the driving experience for the driver is improved, economic loss or potential safety hazards for the driver are effectively prevented that are caused by the cut-in of the second vehicle from the adjacent lane, the cost of self-driving is lowered and the safety is improved.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the drawings that are required to describe the embodiments or the related art will be briefly introduced below. Apparently, the drawings that are described below are merely embodiments of the present disclosure, and a person skilled in the art may obtain other drawings according to these drawings without paying creative work.

The drawings constituting part of the present disclosure are offered to provide a further understanding of the present disclosure. The exemplary embodiments of the present disclosure and their illustrations are used to explain the present disclosure rather than being constructed as an inappropriate limitation to the present disclosure. In the drawings.

DETAILED DESCRIPTION OF THE EMBODIMENTS

The embodiments of the present disclosure are described below in further detail with reference to the drawings. Although the drawings show the embodiments of the present disclosure, it should be understood that the present disclosure may be exemplified in many various forms and should not be construed as being limited to the particular embodiments set forth herein. Rather, these embodiments are provided so that this disclosure will be thorough and complete, and the scope of the present disclosure will be fully conveyed to those skilled in the art.

It should be noted that the embodiments of the present disclosure and the characteristics of the embodiments can be combined with each other if no conflict is caused.

The present disclosure is described below in detail in conjunction with embodiments by reference to the drawings.

Figure 1:
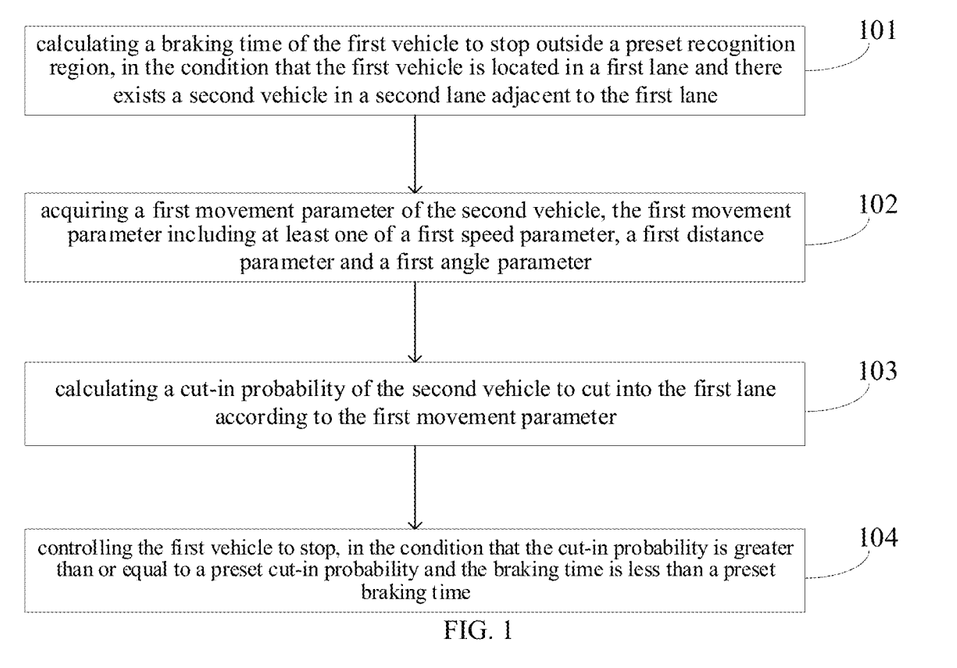
FIG. 1 is a flow diagram of a cruise control method according to an embodiment of the present disclosure.

Referring to FIG. 1, which shows a flow diagram of a cruise control method according to an embodiment of the present disclosure, the cruise control method according to the embodiment of the present disclosure, applied to a first vehicle, includes Step 101 to Step 104.

The cruise control method according to the embodiment of the present disclosure is applied to a first vehicle carrying an ACC system capable of achieving autonomous control and self-driving. The ACC system may control the first vehicle to travel in a first lane based on a speed set by a driver and collect parameters of other vehicles in the first lane or other lanes through an onboard sensor of the first vehicle to perform acceleration, deceleration or braking control, thereby achieving the self-driving of the first vehicle. Optionally, the sensor may include a millimeter wave radar, a laser radar, a camera, etc.

Step 101: a braking time of the first vehicle to stop outside a preset recognition region is calculated, when the first vehicle is located in a first lane and a second vehicle exists in a second lane adjacent to the first lane.

In the embodiments of the present disclosure, during the course of the first vehicle travelling in the first lane, parameter information of other vehicles in a second lane adjacent to the first lane may be collected. Optionally, the second lane may be one lane adjacent to one side of the first lane, also may be two lanes adjacent to two sides of the first lane, and the second vehicle may be at least one vehicle in the second lane that is separated from the first vehicle by a preset distance. Here, distance information may be preliminarily collected between the other vehicles in the second lane and the first vehicle through an onboard sensor of the first vehicle, thereby determining whether the second vehicle exists among the other vehicles in the second lane.

In the embodiments of the present disclosure, an ETC system may include a vehicle recognition device, a bar, etc. The preset recognition region may be a range in which the vehicle recognition device recognizes a vehicle through the vehicle's information to thereby perform fee charge and control the lift of the bar to release the vehicle. The preset recognition region may vary in shape and size depending on different vehicle recognition device parameters. When a vehicle enters the preset recognition region, the vehicle recognition device may collect and recognize vehicle information, and lift the bar to release the vehicle after successful recognition; if other vehicles in the adjacent lane cut in immediately when the bar is lifted, due to the fact that the ACC system is unable to handle the situation where vehicles in the adjacent lane cut in, a temporary emergency switch to the driver is required to control the vehicle, which makes the operation more difficult, impacts the driver experience, and may further cause economic loss or potential safety hazards for the driver.

Therefore, the braking time of the first vehicle to finally stop outside the preset recognition region while braking at the current traveling speed may be calculated, so that the first vehicle can stop in time, thereby preventing the situation that a second vehicle cuts into the first lane to cheat at payment while the first vehicle enters the preset recognition region and successfully interacts with the vehicle recognition device. Optionally, the braking time of the first vehicle to stop may be calculated according to a distance between the first vehicle and an edge or center of the preset recognition region, a traveling speed of the first vehicle, an available acceleration of the first vehicle, etc.

Step 102: a first movement parameter of the second vehicle is acquired, the first movement parameter including at least one of a first speed parameter, a first distance parameter and a first angle parameter.

In the embodiments of the present disclosure, the first movement parameter of the second vehicle may also be acquired through an onboard sensor of the first vehicle; here, the first movement parameter may be information parameters describing the movement state of the second vehicle, including the first speed parameter, the first distance parameter, the first angle parameter, etc. Optionally, the first speed parameter may include a transverse speed, a longitudinal speed, a transverse acceleration, a longitudinal acceleration and the like of the second vehicle; the first distance parameter may be a perpendicular distance from the second vehicle to a nearest lane line of the first lane, or, may be a distance along a direction forming an included angle; the first angle parameter may be an included angle between the second vehicle and a nearest lane line of the first lane, and so on. The embodiments of the present disclosure do not limit the types of the movement parameter of the second vehicle to be collected. Further, when the first movement parameter of the second vehicle is to be acquired, the angle parameter of the second vehicle may be acquired first, thereby preliminarily determining whether the second vehicle is likely to operate a cut-in behavior; when the included angle is zero between the second vehicle and the nearest lane line of the first lane, it may be viewed that the second vehicle is driving straight and the probability to cut in is relatively low, then the movement parameter may not be further collected; on the contrary, it is viewed that the second vehicle is likely to operate a cut-in behavior and the corresponding movement parameter is further collected to determine the cut-in probability of the second vehicle.

In addition, a movement track of the second vehicle may be predicted according to the movement parameter of the second vehicle, thereby determining whether there is a point of collision exists outside the preset recognition region between the second vehicle and the first vehicle; when it is determined that there is a point of collision exists outside the preset recognition region between the second vehicle and the first vehicle, the braking time of the first vehicle to stop may be calculated according to the distance between the point of collision and the first vehicle, the traveling speed of the first vehicle, the deceleration value range of the first vehicle, etc., so as to avoid safety hazards for the first vehicle caused by the cut-in behavior of the second vehicle.

Step 103: a cut-in probability of the second vehicle to cut into the first lane is calculated according to the first movement parameter.

In the embodiments of the present disclosure, the cut-in probability of the second vehicle to cut into the first lane may be determined according to the first movement parameter of the second vehicle; optionally, by collecting the historical movement parameters of the vehicle and the historical behavior data of the vehicle, the probability of occurrence of different behaviors of the vehicle with respect to different movement parameters may be determined, respectively, for example, going straight, taking turns, changing lanes, etc.; therefore, after the first movement parameter of the second vehicle is acquired, the probability of occurrence of the cut-in behavior of the second vehicle may be determined according to the first movement parameter.

Step 104: the first vehicle is controlled to stop, when the cut-in probability is greater than or equal to a preset cut-in probability and the braking time is less than a preset braking time.

In the embodiments of the present disclosure, the preset cut-in probability may refer to the probability that the second vehicle operates no cut-in behavior but is determined to conduct one, for example, the preset cut-in probability may be 80%; when the cut-in probability determined according to the movement parameter is 80%, it is indicated that the cut-in behavior of the second vehicle is not taken place but it certainly will take place; in addition, the preset cut-in probability may also refer to the situation where the second vehicle starts to operate a cut-in behavior, for example, the preset cut-in probability may be 90%, then it may be viewed that the second vehicle starts to operate a cut-in behavior. Those skilled in the art may set the preset cut-in probability as actually needed.

In the embodiments of the present disclosure, when the cut-in probability is greater than the preset cut-in probability, it may be viewed that the second vehicle is about to operate or is operating a cut-in behavior to the first lane; by the time, it may be determined whether the braking time of the first vehicle to stop outside the preset recognition region or before the point of collision is less than the preset braking time; the preset braking time may be obtained by the analysis of the historical movement parameters of the first vehicle, for example, the time needed by the first vehicle to safely, timely and steadily brake within a similar braking distance among the historical movement parameters; when that the braking time is greater than or equal to the preset braking time, there might be safety hazards or bumps during the course of braking of the first vehicle, resulting in poor experience, in such a case the braking time may be calculated again after waiting for some time until the first vehicle reaches the preset recognition region; when the braking time is less than the preset braking time, the first vehicle can be braked to stop.

Figure 2:
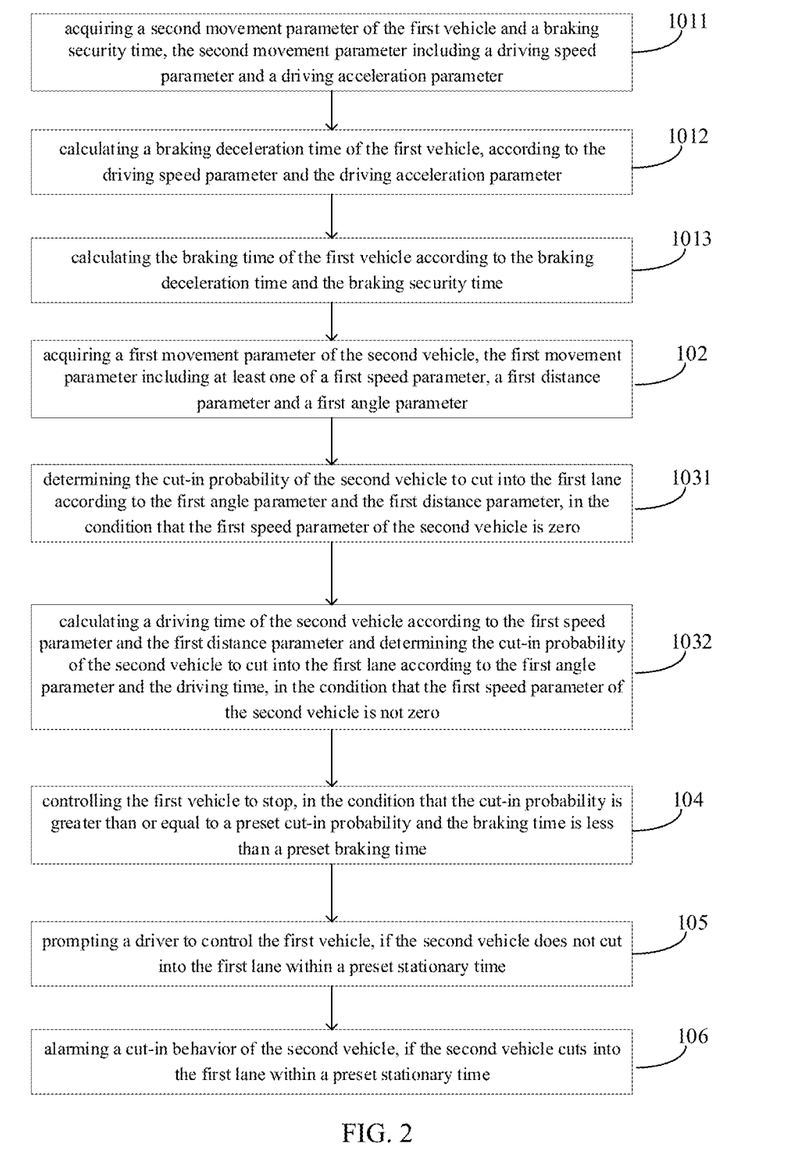
FIG. 2 is a step flowchart of another cruise control method according to an embodiment of the present disclosure.

FIG. 2 is a step flowchart of another cruise control method according to an embodiment of the present disclosure. As shown in FIG. 2, on the basis of FIG. 1, optionally the Step 103 includes the following.

Substep 1031: the cut-in probability of the second vehicle to cut into the first lane is determined according to the first angle parameter and the first distance parameter, when the first speed parameter of the second vehicle is zero.

Substep 1032: a traveling time of the second vehicle is calculated according to the first speed parameter and the first distance parameter, and the cut-in probability of the second vehicle to cut into the first lane is determined according to the first angle parameter and the traveling time, when the first speed parameter of the second vehicle is not zero.

In the embodiments of the present disclosure, different methods may be selected to determine the cut-in probability, depending on the first speed parameter of the second vehicle; for example, when the first speed parameter is 0, that is, the second vehicle is in a stationary state, the cut-in probability of the second vehicle to cut into the first lane may be determined according to the first angle parameter and the first distance parameter of the second vehicle; from the statistical analysis of the historical movement parameters and the historical behavior data of the vehicle, the larger the first angle parameter and the smaller the first distance parameter, the greater the cut-in probability; when the first speed parameter is not 0, that is, the second vehicle is in a moving state, the traveling time of the second vehicle may be calculated according to the movement parameter of the second vehicle; the traveling time may refer to the time that the second vehicle needs to reach the nearest lane line of the first lane. Optionally, the traveling time of the second vehicle may be calculated through the following formula.

$$d_y = v_y * t + (at^2)/2 \tag{1}$$

where $d_y$ represents a transverse distance between the second vehicle and the nearest lane line of the first lane, $v_y$ represents a transverse traveling speed of the second vehicle, a represents a transverse acceleration of the second vehicle, and t represents a traveling time of the second vehicle; after the traveling time of the second vehicle is calculated, the cut-in probability of the second vehicle may be determined according to the relationship between the first angle parameter, the traveling time and the cut-in probability that is obtained through a statistical analysis of the historical movement parameter and the historical behavior data of the vehicle, thus ensuring the accuracy of calculation of the cut-in probability of the second vehicle.

Figure 3:
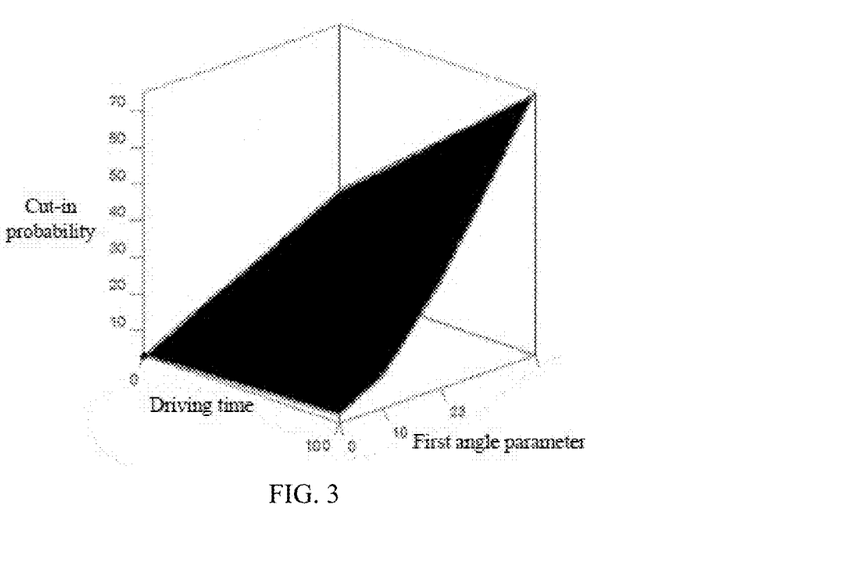
FIG. 3 is a diagram of a relationship between a movement parameter and a cut-in probability according to an embodiment of the present disclosure.

FIG. 3 is a diagram of a relationship between a movement parameter and a cut-in probability according to an embodiment of the present disclosure. As shown in FIG. 3, when the first speed parameter is not 0, the cut-in probability of the second vehicle may be uniquely determined according to the calculated traveling time and the first angle parameter.

Optionally, the Step 101 includes the following.

Substep 1011: a second movement parameter of the first vehicle and a braking security time are acquired, the second movement parameter including a traveling speed parameter and a traveling acceleration parameter.

Substep 1012: a braking deceleration time of the first vehicle is calculated, according to the traveling speed parameter and the traveling acceleration parameter.

Substep 1013: the braking time of the first vehicle is calculated according to the braking deceleration time and the braking security time.

In the embodiments of the present disclosure, the braking time of the first vehicle may include the braking deceleration time and the security time, wherein the security time may include a reaction time of the first vehicle from confirming braking to actually implementing braking, etc.; the traveling acceleration parameter may be a deceleration, that is, an acceleration in an opposite direction to the traveling speed, the braking deceleration time may be a time needed for the first vehicle's speed to decrease to 0 when the deceleration is applied, the value of the deceleration may be determined according to the distance between the first vehicle and the edge or center of the preset recognition region or between the first vehicle and the point of collision, which may be a constant value or a value varying with the braking process. Optionally, by collecting the traveling speed parameter and the traveling acceleration parameter of the first vehicle, the braking deceleration time of the first vehicle may be calculated, and then the actual braking time needed for the first vehicle to stop may be obtained by adding the braking deceleration time to the security time.

Optionally, after the Step 104, the method may further include the following.

Step 105: a driver is prompted to control the first vehicle, if the second vehicle does not cut into the first lane within a preset stationary time.

Step 106: a cut-in behavior of the second vehicle is alarmed, if the second vehicle cuts into the first lane within a preset stationary time.

In the embodiments of the present disclosure, after the first vehicle is controlled to stop, the first vehicle may be controlled to be motionless within a preset stationary time so as to wait for the reaction of the second vehicle; if the second vehicle does not cut into the first lane, it might be that the cut-in probability is mis-determined, or the second vehicle stops the cut-in behavior, then the driver may be prompted to take over the first vehicle to control the driving, alternatively, the first vehicle may be controlled to restart and self-drive at a preset speed according to a predetermined setting from the driver; if the second vehicle cuts into the first lane, the cut-in behavior of the second vehicle may be alarmed; optionally, the warning may be given to the driver, for example, outputting a voice or text such as "Vehicle cutting into ahead the lane, danger of collision"; alternatively, the second vehicle may be alarmed, for example, outputting a voice or text such as "Your driving is illegal and of high risk"; alternatively, the shot video data about the cut-in behavior of the second vehicle may be transmitted to the transportation administrative department to give a warning, and so on. The embodiments of the present disclosure do not limit the objects and modes of warnings.

Optionally, after the Step 103, the method may further include the following:

The first vehicle is controlled to enter the preset recognition region at a preset traveling speed, when that the cut-in probability is less than the preset cut-in probability.

In the embodiments of the present disclosure, when the cut-in probability is less than the preset cut-in probability, it may be viewed that the probability of the second vehicle conducting the cut-in behavior is low; by the time, the first vehicle may be controlled to enter the preset recognition region at a preset traveling speed, wherein the preset traveling speed, generally lower than the traveling speed of the first vehicle, is a traveling speed to facilitate the vehicle recognition device within the preset recognition region to recognize the first vehicle; after the first vehicle enters the preset recognition region, the vehicle recognition device within the preset recognition region may begin to recognize the first vehicle; optionally, the preset recognition region may be a range within 3 meters or 5 meters from the vehicle recognition device and so on.

The first vehicle is controlled to leave the preset recognition region, when the first vehicle receives successful recognition information.

The first vehicle is controlled to stop and the driver is prompted to control the first vehicle, when the first vehicle does not receive successful recognition information.

In the embodiments of the present disclosure, the vehicle recognition device may recognize the first vehicle by acquiring the license plate information of the vehicle, the credential information of the vehicle owner, etc.; after successful recognition of the first vehicle, the vehicle recognition device may recognize the first vehicle according to the electronic label information of the first vehicle and transmit a recognition signal to the first vehicle; the first vehicle, after receiving the recognition signal, may determine according to the recognition signal whether the vehicle recognition device recognizes the first vehicle successfully; if the recognition is successful, the bar within the preset recognition region is lifted and the first vehicle may leave the preset recognition region; if no recognition signal is received or a recognition signal indicative of failed recognition is received, the first vehicle may be controlled to stop and the driver is prompted to control the first vehicle.

Figure 4:
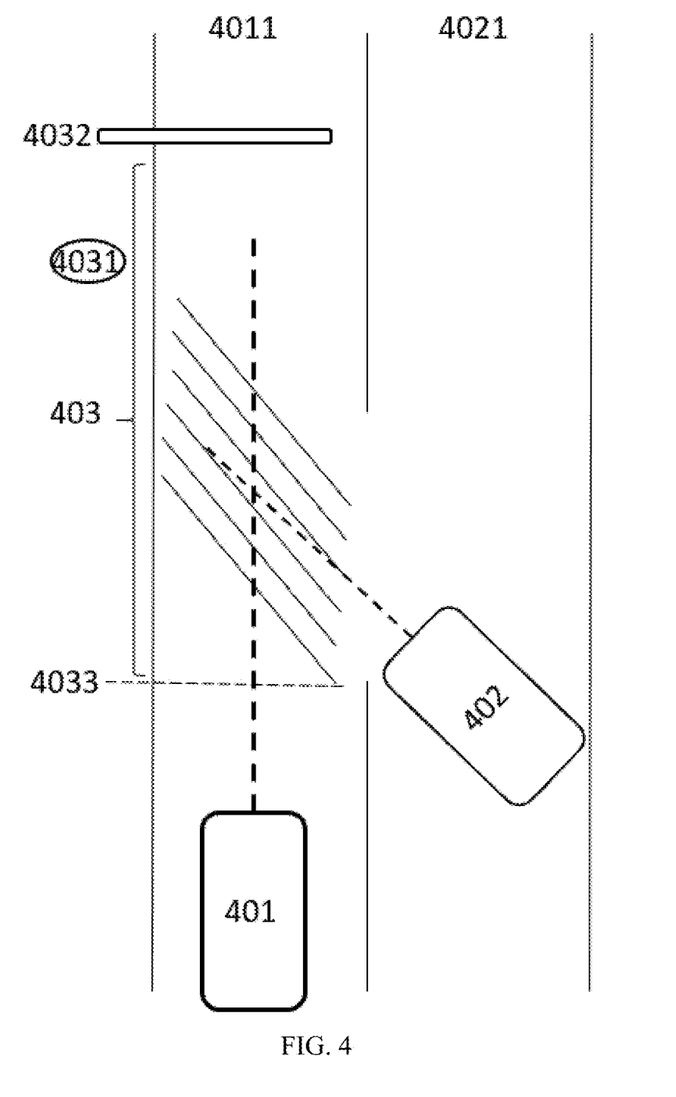
FIG. 4 is a diagram of an application scenario of a cruise control method according to an embodiment of the present disclosure.

FIG. 4 is a diagram of an application scenario of a cruise control method according to an embodiment of the present disclosure. As shown in FIG. 4, the application scenario includes a first vehicle 401, a first lane 4011, a second vehicle 402, a second lane 4021 and a preset recognition region 403, wherein the preset recognition region 403 includes a vehicle recognition device 4031, a bar 4032 and a preset recognition region edge line 4033.

From FIG. 4, the second vehicle 402 is close to the nearest side of the first lane 4011 and the included angle therebetween is large, then it may be viewed that the second vehicle 402 has a high probability of cutting into the first lane 4011 from the second lane 4021. At this moment in time, if the calculated braking time of the first vehicle is less than a preset braking time, the first vehicle 401 may be braked to stop, so that it stops before the preset recognition region edge line 4033, waiting for the second vehicle 402 to complete the cut-in behavior and pass through the preset recognition region 403; and after that, the first vehicle 401 is controlled to pass through the preset recognition region 403.

The first vehicle 401 may move at a preset traveling speed to pass through the preset recognition region 403; while the first vehicle 401 passes through the vehicle recognition device 4031, the vehicle recognition device 4031 may recognize the electronic label of the first vehicle, and the first vehicle 401 may receive a recognition signal transmitted by the vehicle recognition device 4031 to determine whether the recognition of the first vehicle 401 is successful or not, thereby determining whether the subsequent operation is to control the first vehicle 401 to pass through the lifted bar 4032 and leave the preset recognition region or to control the first vehicle 401 to brake and prompt the driver to control the vehicle.

Optionally, before the Step 101, the method may further include the following.

Location information of the first vehicle is acquired.

The target vehicle is controlled to decelerate when the location information and the preset recognition region reach a preset deceleration distance, the preset deceleration distance being calculated from a current traveling speed of the first vehicle, a preset traveling speed and a deceleration.

In the embodiments of the present disclosure, before the first vehicle enters the preset recognition region, the first vehicle may be decelerated in order to reach a preset traveling speed recognizable by the vehicle recognition device; for example, the current traveling speed of the first vehicle is 120 kilometers per hour and the preset traveling speed is 20 kilometers per hour, in order to improve the experience of the driver during the deceleration process, the current traveling speed of the first vehicle may be controlled to achieve a gradient descent from 120 to 60 to 40 to 20 kilometers per hour, thus ensuring the steadiness and safety of the first vehicle during the deceleration process.

Optionally, the location information of the first vehicle and the location information of the preset recognition region are acquired first; since the first vehicle needs to complete deceleration before entering the preset recognition region, the location information of the preset recognition region may be the location information of one nearest side of the preset recognition region to the first vehicle, wherein the location information may be determined by the Global Position System (GPS) of the first vehicle, a lane map and the like, which are not limited in the embodiments of the present disclosure.

After the location information of the first vehicle and the location information of the preset recognition region are acquired, the traveling time may be calculated through the following fundamental formula:

$$d = \frac{(v_1^2 - v_0^2)}{2a} \quad (2)$$

where d represents a distance between the location information of the first vehicle and the location information of the preset recognition region, $v_0$ represents the current speed of the first vehicle, $v_1$ represents the preset traveling speed of the first vehicle, and a represents a deceleration of the first vehicle; optionally, the slope and the limit of the deceleration may be determined, according to the size of the acceleration parameters and the deceleration experience data fed back by the driver among the historical movement parameters of the first vehicle, so that the first vehicle undergoes comfortable deceleration control and is prevented from faltering during the deceleration process.

Figure 8:
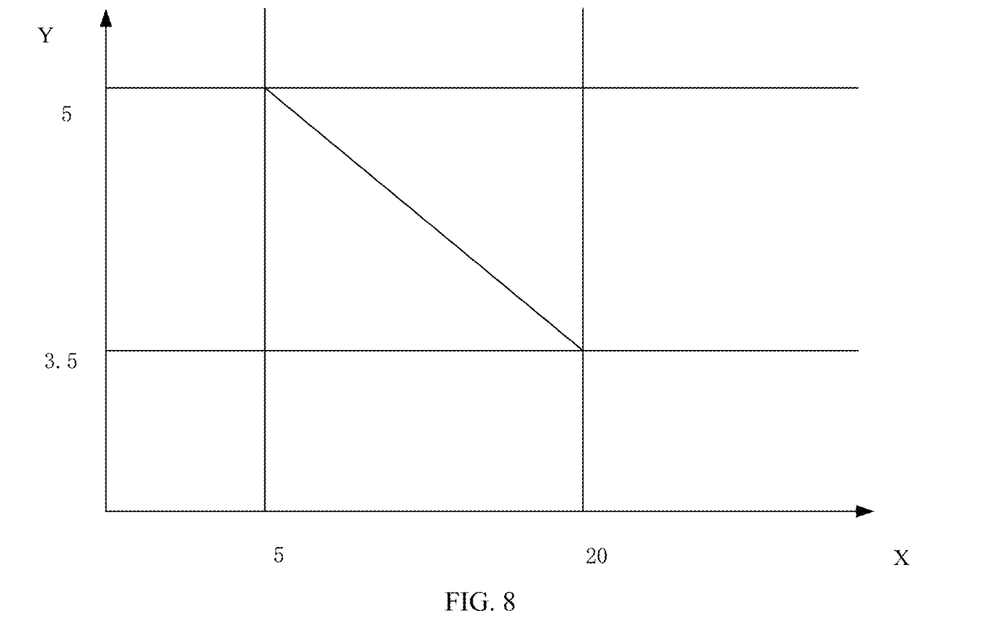
FIG. 8 is a diagram of a relationship between a current traveling speed and an acceleration specified in ISO standards.
Figure 9:
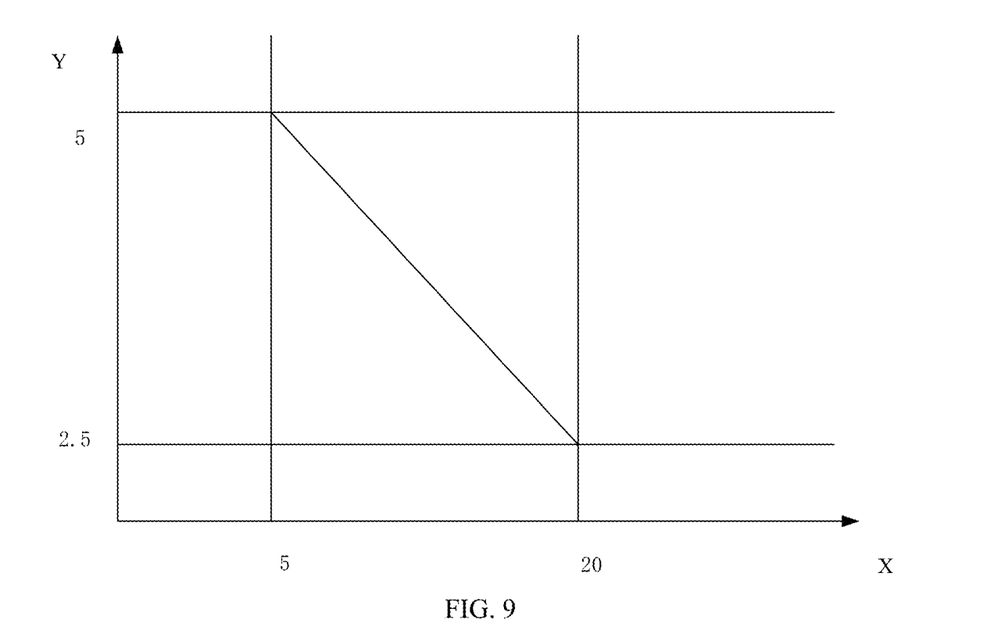
FIG. 9 is a diagram of a relationship between a current traveling speed and a rate of change of acceleration specified in ISO standards.

In the embodiments of the present disclosure, the deceleration may be obtained according to International Standard Organization (ISO) standards during actual applications. The ISO standards refer to the international standards formulated by the ISO in various fields of technologies other than electrical standards, wherein the acceleration and the acceleration slope are provided with the following rules.

As shown in FIG. 8, the X axis represents a current traveling speed (m\s), the Y axis represents a deceleration value (m\s$^2$); as shown in FIG. 9, the X axis represents a current traveling speed (m\s), the Y axis represents a rate of change of deceleration (m/s$^3$).

From the above ISO standards, in order to ensure driving security, when the first vehicle travels at a low speed of 5 m\s, the adoptable maximum deceleration is −5 m\S$^2$, for example, the deceleration of the first vehicle changes from 0 m\S$^2$ to −5 m\S$^2$; further, the rate of change of the deceleration may also be limited according to the standards, which may be less than or equal to −5 m\S$^3$; when at a high speed of above 20 m\s, the adoptable maximum deceleration is −3.5 m\S$^2$, and the rate of change of the deceleration is greater than or equal to 2.5 m\s$^3$. Those skilled in the art may select a deceleration parameter of a corresponding range according to the model number, the specification, the historical movement parameters and the like of the first vehicle. For example, the current traveling speed of the first vehicle is 60 kilometers per hour, the preset traveling speed is 20 kilometers per hour, and the speed needs to decrease from 60 kilometers per hour to 20 kilometers per hour, then −3.5 m\S$^2$ is adopted to implement deceleration; according to the formula, the first vehicle needs to decelerate when the distance is 35 m between the location information of the first vehicle and the location information of the preset recognition region. By selecting an appropriate deceleration to decelerate the current traveling speed, the deceleration process is comfortable and unfelt, and the use experience of the driver is improved. In addition, the preset traveling speed may be set according to the demand of the vehicle recognition device, so as to ensure a high rate of successful recognition of the first vehicle by the vehicle recognition device and improve the efficiency of the first vehicle passing through the ETC system.

Optionally, after the Step 103, the method may further include the following.

Problem data is acquired within a preset duration before and after the cut-in time at which the second vehicle cuts into the first lane, when the cut-in probability is less than the preset cut-in probability and the second vehicle cuts into the first lane.

In the embodiments of the present disclosure, when the calculated cut-in probability of the second vehicle is less than the preset cut-in probability, it is indicated that the probability of the second vehicle conducting the cut-in behavior is low; however, if the second vehicle cuts into the first lane in the subsequent process, it is indicated that there might be an error in the corresponding relationship between the foregoing movement parameter and the cut-in probability; then, the problem data may be collected through an onboard sensor of the first vehicle within the preset duration before and after the cut-in time at which the second vehicle cuts into the first lane, for example, the video data of the second vehicle may be acquired through an onboard camera within 15 seconds before and after the cut-in time, the movement track data of the second vehicle may be acquired through a distance sensor within 20 seconds before and after the cut-in time, and so on, so as to improve and update the corresponding relationship between the movement parameter and the cut-in probability and ensure the accuracy of the subsequent calculation of the cut-in probability.

Figure 5:
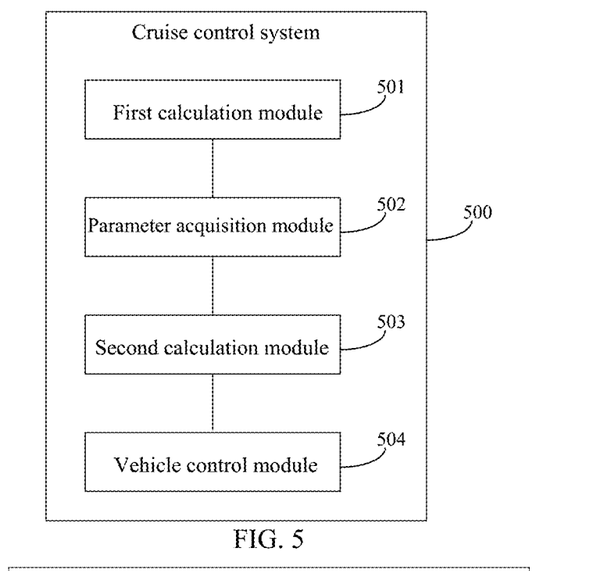
FIG. 5 is a structural diagram of a cruise control system according to an embodiment of the present disclosure.

It is another object of the present disclosure to provide a cruise control system, which is applied to a first vehicle. Referring to FIG. 5, which is structural diagram of a cruise control system according to an embodiment of the present disclosure, the system includes:

- a first calculation module 501, configured for calculating a braking time of the first vehicle to stop outside a preset recognition region, when the first vehicle is located in a first lane and a second vehicle exists in a second lane adjacent to the first lane;
- a parameter acquisition module 502, configured for acquiring a first movement parameter of the second vehicle, the first movement parameter including at least one of a first speed parameter, a first distance parameter and a first angle parameter;
- a second calculation module 503, configured for calculating a cut-in probability of the second vehicle to cut into the first lane according to the first movement parameter; and
- a vehicle control module 504, configured for controlling the first vehicle to stop, when that the cut-in probability is greater than or equal to a preset cut-in probability and the braking time is less than a preset braking time.

In the embodiments of the present disclosure, the vehicle control module 504 may be associated to a sensor and an actuator of the first vehicle, for example, being associated to a steering wheel angle sensor, a yaw angle acceleration sensor, an electronic stability program, etc., so as to achieve transverse and longitudinal control of the first vehicle.

Optionally, in the system, the second calculation module 503 includes:

- a first probability calculation submodule, configured for determining the cut-in probability of the second vehicle to cut into the first lane according to the first angle parameter and the first distance parameter, when the first speed parameter of the second vehicle is zero; and
- a second probability calculation submodule, configured for calculating a traveling time of the second vehicle according to the first speed parameter and the first distance parameter and determine the cut-in probability of the second vehicle to cut into the first lane according to the first angle parameter and the traveling time, when the first speed parameter of the second vehicle is not zero.

Optionally, in the system, the first calculation module 501 includes:

- a parameter acquisition submodule, configured for acquiring a second movement parameter of the first vehicle and a braking security time, the second movement parameter including a traveling speed parameter and a traveling acceleration parameter; and
- a braking time calculation submodule, configured for calculating a braking deceleration time of the first vehicle, according to the traveling speed parameter and the traveling acceleration parameter.

The braking time calculation submodule is further configured for calculating the braking time of the first vehicle according to the braking deceleration time and the braking security time.

Optionally, the system further includes:

- a man-machine interactive module, configured for prompting a driver to control the first vehicle, if the second vehicle does not cut into the first lane within a preset stationary time.

The man-machine interactive module is further configured for alarming a cut-in behavior of the second vehicle, if the second vehicle cuts into the first lane within a preset stationary time.

Optionally, in the system, the vehicle control module 504 is further configured for:

- controlling the first vehicle to enter the preset recognition region at a preset traveling speed, when that the cut-in probability is less than the preset cut-in probability;
- controlling the first vehicle to leave the preset recognition region, when the first vehicle receives successful recognition information; and
- controlling the first vehicle to stop and prompting the driver to control the first vehicle, when the first vehicle does not receive successful recognition information.

Optionally, in the system, the parameter acquisition module 502 is further configured for acquiring location information of the first vehicle.

The vehicle control module 504 is further configured for controlling the target vehicle to decelerate when the location information and the preset recognition region reach a preset deceleration distance, the preset deceleration distance being calculated from a current traveling speed of the first vehicle, a preset traveling speed and a deceleration.

Optionally, in the system, the parameter acquisition module 502 is further configured for acquiring problem data within a preset duration before and after the cut-in time at which the second vehicle cuts into the first lane, when that the cut-in probability is less than the preset cut-in probability and the second vehicle cuts into the first lane.

In addition, in the embodiments of the present disclosure, the above modules are limited in terms of functions only, they may be implemented by being integrated into one same entity, for example, the functions of the first calculation module 501, the second calculation module 503 and the like mentioned above may be realized through a central control module of the first vehicle.

An embodiment of the present disclosure further provides a vehicle; the vehicle includes a system for implementing the cruise control method described above, or, the vehicle includes the cruise control system described above.

The cruise control system and the vehicle have the same advantages as the cruise control method described above relative to the conventional technology, and thus further description thereof is omitted.

To sum up, before the first vehicle enters a preset recognition region from the first lane where it is located to thereby complete vehicle identity recognition in the preset recognition region, a cut-in probability of a second vehicle that is in an adjacent second lane to cut into the first lane may be predicted according to the movement parameter of the second vehicle, and then it may be determined whether to brake the first vehicle according to the cut-in probability and a braking time of the first vehicle, so that the driver is not required to temporarily take over control of the first vehicle during the course of controlling the first vehicle to pass through the preset recognition region, the driver is not required to temporarily take over control of the first vehicle;

therefore, the driving experience for the driver is improved, economic loss or potential safety hazards for the driver are effectively prevented that are caused by the cut-in of the second vehicle from the adjacent lane, the cost of self-driving is lowered and the safety is improved.

It is clear to those skilled in the art that the specific operation process of the above system, device and unit may refer to the corresponding process in the method embodiments described above for the purpose of convenient and concise description, and thus further description thereof is omitted.

The device embodiments described above are exemplary merely. The above unit described as a separate component may be or may not be physically separated; the component, displayed as a unit, may be or may not be a physical unit, that is, it may be located at one place, or may be distributed on a plurality of network units. Part or all modules may be selected to realize the purpose of the embodiment scheme according to actual needs. Those of ordinary skill in the art can understand and implement without paying creative work.

Component embodiments of the present disclosure may be implemented through hardware, or through a software module running on one or more processors, or through a combination thereof. Those skilled in the art should understand that part or full functions of part or all components in the calculation processing device according to the embodiments of the present disclosure may be implemented using a microprocessor or a Digital Signal Processor (DSP) during practices. The present disclosure may also be implemented as a device or device program (for example, a computer program and a computer program product) configured to execute part or the entirety of the method described herein. Such programs configured to implement the present disclosure may be stored in a computer readable medium, or, may have a form of one or more signals. Such signals may be obtained through download from an Internet website, or may be provided in the form of carrier, or may be provided in any other forms.

Figure 6:
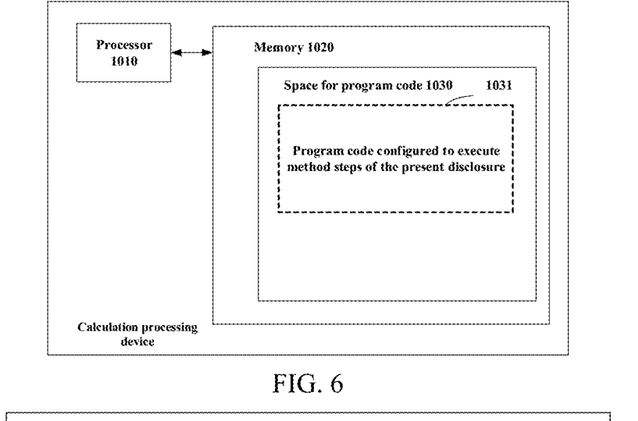
FIG. 6 schematically shows a block diagram of a calculation processing device for executing the method of the present disclosure.
Figure 7:
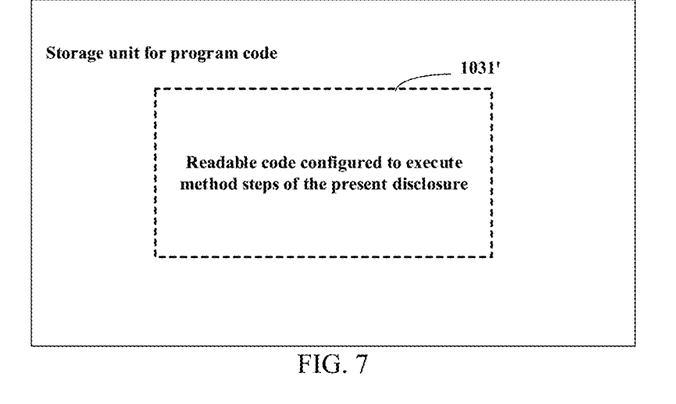
FIG. 7 schematically shows a storage unit for keeping or carrying a program code for implementing the method of the present disclosure.

For example, FIG. 6 shows a calculation processing device capable of implementing the method of the present disclosure. The calculation processing device conventionally includes a processor 1010, and a computer program product or a computer readable medium in the form of memory 1020. The memory 1020 may be such electronic memories as flash memory, Electrically Erasable Programmable Read-Only Memory (EEPROM), Electrical Programmable Read Only Memory (EPROM), hard disk or Read-Only Memory (ROM). The memory 1020 includes a storage space 1030 for a program code 1031 configured to execute any method steps in the above method. For example, the storage space 1030 for the program code may include various program codes 1031 configured to implement various steps in the above method respectively. These program codes may be read from or written into one or more computer program products. These computer program products include such program code carriers as hard disk, Compact Disk (CD), memory card or soft disk. Such computer program products generally are a portable or fixed storage unit as shown in FIG. 7. The storage unit may include the similar arrangement of storage segment, storage space and the like to the memory 1020 in the calculation processing device shown in FIG. 6. The program code may be compressed, for example, in a proper form. Generally, the storage unit includes a computer readable code 1031', that is, a code that can be read by, for example, a processor such as 1010. These codes, when run by the calculation processing device, causes the calculation processing device to execute each step in the method described above.

What is called "one embodiment", "embodiment" or "one or more embodiments" in this paper means that the particular features, structures or characteristics described in combination with the embodiment are included in at least one embodiment of the present disclosure. In addition, note that the phrase example "in one embodiment" does not necessarily all refer to the same embodiment.

A great number of specific details are illustrated in the description provided herein. However, it is understandable that the embodiments of the present disclosure may be put into practice without these specific details. In some embodiments, the well-known methods, structures and technologies are not illustrated in detail for the purpose of not blurring the understanding of the description provided herein.

In the claims appended hereinafter, any reference designators in parentheses should not be constructed as a limitation to the claims. The term "comprise" does not preclude an element or step not listed in the claims. The term "a" or "an" located before the element does not preclude the presences of multiple such elements. The present disclosure may be implemented by means of hardware including umpty different elements and by means of a properly programmed computer. In the unit claims enumerating umpty devices, several of these devices may be embodied by one same hardware item. Terms such as first, second and third are not used for indicating any precedence order and may be interpreted as a name. The above are merely preferred embodiments of the present disclosure and are not intended to limit the present disclosure. Any modifications, equivalent substitutes and improvements, etc., made within the spirit and principle of the present disclosure all are intended to fall within the scope of protection of the present disclosure.

The above are merely particular embodiments of the present disclosure, and the protection scope of the present disclosure is not limited thereto. All of the variations or substitutions that a person skilled in the art may easily envisage within the technical scope disclosed by the present disclosure should fall within the protection scope of the present disclosure. Therefore, the protection scope of the present disclosure should be subject to the protection scope of the claims appended hereinafter.

The invention claimed is:

1. A cruise control method, applied to a first vehicle, wherein the method comprises:
by one or more processors, calculating a braking time of the first vehicle to stop outside a preset recognition region when the first vehicle is located in a first lane and a second vehicle exists in a second lane adjacent to the first lane, wherein the preset recognition region is a region in which a vehicle recognition device of an electronic toll collection system recognizes vehicles, and the braking time refers to time required for the first vehicle to brake at a current traveling speed and stop outside the preset recognition region;
by one or more processors, acquiring a first movement parameter of the second vehicle, the first movement parameter comprising at least one of a first speed parameter, a first distance parameter and a first angle parameter;
by one or more processors, calculating a cut-in probability of the second vehicle to cut into the first lane according to the first movement parameter; and by one or more processors, controlling the first vehicle to stop when the cut-in probability is greater than or equal to a preset cut-in probability and the braking time is less than a preset braking time.

2. The method according to claim 1, wherein calculating the cut-in probability of the second vehicle to cut into the first lane according to the first movement parameter comprises:
determining the cut-in probability of the second vehicle to cut into the first lane according to the first angle parameter and the first distance parameter when the first speed parameter of the second vehicle is zero; and
calculating a traveling time of the second vehicle according to the first speed parameter and the first distance parameter, and determining the cut-in probability of the second vehicle to cut into the first lane according to the first angle parameter and the traveling time, when the first speed parameter of the second vehicle is not zero.

3. The method according to claim 1, wherein calculating the braking time of the first vehicle to stop outside the preset recognition region, when the first vehicle is located in the first lane and a second vehicle exists in a second lane adjacent to the first lane, comprises:
acquiring a second movement parameter of the first vehicle and a braking security time, the second movement parameter comprising a traveling speed parameter and a traveling acceleration parameter;
calculating a braking deceleration time of the first vehicle according to the traveling speed parameter and the traveling acceleration parameter; and
calculating the braking time of the first vehicle according to the braking deceleration time and the braking security time.

4. The method according to claim 3, wherein after controlling the first vehicle to stop, when the cut-in probability is greater than or equal to the preset cut-in probability and the braking time is less than the preset braking time, the method further comprises:
prompting a driver to control the first vehicle when the second vehicle does not cut into the first lane within a preset stationary time; and
alarming for a cut-in behavior of the second vehicle, if the second vehicle cuts into the first lane within the preset stationary time.

5. The method according to claim 1, wherein after calculating the cut-in probability of the second vehicle to cut into the first lane according to the first movement parameter, the method further comprises:
controlling the first vehicle to enter the preset recognition region at a preset traveling speed, when that the cut-in probability is less than the preset cut-in probability;
controlling the first vehicle to leave the preset recognition region when the first vehicle receives successful recognition information; and
controlling the first vehicle to stop and prompting a driver to control the first vehicle, when the first vehicle does not receive successful recognition information.

6. The method according to claim 1, wherein before calculating the braking time of the first vehicle to stop outside the preset recognition region, when the first vehicle is located in the first lane and the second vehicle exists in the second lane adjacent to the first lane, the method further comprises:
acquiring location information of the first vehicle; and
controlling a target vehicle to decelerate when the location information and the preset recognition region reach a preset deceleration distance, the preset deceleration distance being calculated from the current traveling speed of the first vehicle, a preset traveling speed and a deceleration.

7. The method according to claim 1, wherein after calculating the cut-in probability of the second vehicle to cut into the first lane according to the first movement parameter, the method further comprises:
acquiring problem data within a preset duration before and after a cut-in time at which the second vehicle cuts into the first lane, when the cut-in probability is less than the preset cut-in probability and the second vehicle cuts into the first lane.

8. A vehicle, further comprising a system for implementing the cruise control method according to claim 1.

9. A non-transitory computer readable medium, wherein the non-transitory computer readable medium stores a computer readable code, and when the computer readable code is executed, the cruise control method according to claim 1 is performed.

10. A cruise control system, applied to a first vehicle, wherein the system comprises:
one or more processors and a storage apparatus; and
the storage apparatus stores a computer program which, when executed by the processor, perform the operations comprising:
calculating a braking time of the first vehicle to stop outside a preset recognition region, when the first vehicle is located in a first lane and a second vehicle exists in a second lane adjacent to the first lane, wherein the preset recognition region is a region in which a vehicle recognition device of an electronic toll collection system recognizes vehicles, and the braking time refers to time required for the first vehicle to brake at a current traveling speed and stop outside the preset recognition region;
acquiring a first movement parameter of the second vehicle, the first movement parameter comprising at least one of a first speed parameter, a first distance parameter and a first angle parameter;
calculating a cut-in probability of the second vehicle to cut into the first lane according to the first movement parameter; and
controlling the first vehicle to stop, when the cut-in probability is greater than or equal to a preset cut-in probability and the braking time is less than a preset braking time.

11. The system according to claim 10, wherein the operations of the system comprise:
determining the cut-in probability of the second vehicle to cut into the first lane according to the first angle parameter and the first distance parameter, when the first speed parameter of the second vehicle is zero; and
calculating a traveling time of the second vehicle according to the first speed parameter and the first distance parameter, and determining the cut-in probability of the second vehicle to cut into the first lane according to the first angle parameter and the traveling time, when the first speed parameter of the second vehicle is not zero.

12. A calculation processing device, comprising:
a memory having stored therein a computer readable code; and
one or more processors; wherein when the computer readable code is executed by the one or more processors, the calculation processing device executes a cruise control method, applied to a first vehicle, wherein the method comprises:

calculating a braking time of the first vehicle to stop outside a preset recognition region when the first vehicle is located in a first lane and a second vehicle exists in a second lane adjacent to the first lane, wherein the preset recognition region is a region in which a vehicle recognition device of an electronic toll collection system recognizes vehicles, and the braking time refers to time required for the first vehicle to brake at a current traveling speed and stop outside the preset recognition region;

acquiring a first movement parameter of the second vehicle, the first movement parameter comprising at least one of a first speed parameter, a first distance parameter and a first angle parameter;

calculating a cut-in probability of the second vehicle to cut into the first lane according to the first movement parameter; and controlling the first vehicle to stop when the cut-in probability is greater than or equal to a preset cut-in probability and the braking time is less than a preset braking time.

13. The device according to claim 12, wherein calculating the cut-in probability of the second vehicle to cut into the first lane according to the first movement parameter comprises:

determining the cut-in probability of the second vehicle to cut into the first lane according to the first angle parameter and the first distance parameter when the first speed parameter of the second vehicle is zero; and calculating a traveling time of the second vehicle according to the first speed parameter and the first distance parameter, and determining the cut-in probability of the second vehicle to cut into the first lane according to the first angle parameter and the traveling time, when the first speed parameter of the second vehicle is not zero.

14. The device according to claim 12, wherein calculating the braking time of the first vehicle to stop outside the preset recognition region, when the first vehicle is located in the first lane and a second vehicle exists in a second lane adjacent to the first lane, comprises:

acquiring a second movement parameter of the first vehicle and a braking security time, the second movement parameter comprising a traveling speed parameter and a traveling acceleration parameter;

calculating a braking deceleration time of the first vehicle according to the traveling speed parameter and the traveling acceleration parameter; and calculating the braking time of the first vehicle according to the braking deceleration time and the braking security time.

15. The device according to claim 14, wherein after controlling the first vehicle to stop, when the cut-in probability is greater than or equal to the preset cut-in probability and the braking time is less than the preset braking time, the method further comprises:

prompting a driver to control the first vehicle when the second vehicle does not cut into the first lane within a preset stationary time; and alarming for a cut-in behavior of the second vehicle, if the second vehicle cuts into the first lane within a preset stationary time.

16. The device according to claim 12, wherein after calculating the cut-in probability of the second vehicle to cut into the first lane according to the first movement parameter, the method further comprises:

controlling the first vehicle to enter the preset recognition region at a preset traveling speed, when that the cut-in probability is less than the preset cut-in probability;

controlling the first vehicle to leave the preset recognition region when the first vehicle receives successful recognition information; and controlling the first vehicle to stop and prompting a driver to control the first vehicle, when the first vehicle does not receive successful recognition information.

17. The device according to claim 12, wherein before calculating the braking time of the first vehicle to stop outside the preset recognition region, when the first vehicle is located in the first lane and the second vehicle exists in the second lane adjacent to the first lane, the method further comprises:

acquiring location information of the first vehicle; and controlling a target vehicle to decelerate when the location information and the preset recognition region reach a preset deceleration distance, the preset deceleration distance being calculated from the current traveling speed of the first vehicle, a preset traveling speed and a deceleration.

18. The device according to claim 12, wherein after calculating the cut-in probability of the second vehicle to cut into the first lane according to the first movement parameter, the method further comprises:

acquiring problem data within a preset duration before and after a cut-in time at which the second vehicle cuts into the first lane, when the cut-in probability is less than the preset cut-in probability and the second vehicle cuts into the first lane.

* * * * *